(12) United States Patent
Yomo et al.

(10) Patent No.: US 8,724,651 B2
(45) Date of Patent: May 13, 2014

(54) RADIO NETWORK SYSTEM, RADIO COMMUNICATION METHOD, AND RADIO COMMUNICATION DEVICE

(75) Inventors: Hidekuni Yomo, Tokyo (JP); Naoki Adachi, Kanagawa (JP); Takaaki Kishigami, Tokyo (JP); Yoichi Nakagawa, Tokyo (JP); Shutai Okamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1449 days.

(21) Appl. No.: 12/063,821

(22) PCT Filed: Aug. 25, 2006

(86) PCT No.: PCT/JP2006/316685
§ 371 (c)(1),
(2), (4) Date: Feb. 14, 2008

(87) PCT Pub. No.: WO2007/026606
PCT Pub. Date: Mar. 8, 2007

(65) Prior Publication Data
US 2009/0109943 A1    Apr. 30, 2009

(30) Foreign Application Priority Data
Aug. 29, 2005    (JP) ................................. 2005-247125

(51) Int. Cl.
*H04L 12/43*    (2006.01)
(52) U.S. Cl.
USPC ........ 370/461; 370/332; 370/447; 455/452.2; 455/440; 455/456.1

(58) Field of Classification Search
USPC .............. 370/310.2, 328, 338, 445–457, 458, 370/442, 443, 461, 462
See application file for complete search history.

(56) References Cited

U.S. PATENT DOCUMENTS 5,566,191 A * 10/1996 Ohnishi et al. ................. 714/794
5,661,727 A *  8/1997 Kermani et al. ............... 370/445
6,192,053 B1 *  2/2001 Angelico et al. .............. 370/448

(Continued)

FOREIGN PATENT DOCUMENTS

| JP | 2001-345809 A | 12/2001 |
| JP | 2002-353975 A | 12/2002 |
| JP | 2004-289411 A | 10/2004 |

OTHER PUBLICATIONS

International Search Report for Application No. PCT/JP2006/316685 dated Nov. 7, 2006.

(Continued)

*Primary Examiner* — Jackie Zuniga Abad
(74) *Attorney, Agent, or Firm* — RatnerPrestia

(57) ABSTRACT

A wireless network system including a first terminal for sending a request-to-send signal including information on a medium use period to a second terminal before sending data, receiving a clear-to-send signal from the second terminal, and sending data to the second terminal during the medium use period; the second terminal for receiving the request-to-send signal and sending the clear-to-send signal; a third terminal for receiving the request-to-send signal and transmitting data to a fourth terminal during the medium use period; and the fourth terminal. Thus, it is possible to prevent occurrence of a problem that when it is judged that the wireless channel is being used, transmission of the station is suppressed.

22 Claims, 14 Drawing Sheets

(56) References Cited

U.S. PATENT DOCUMENTS

| | | | |
|---|---|---|---|
| 6,636,738 B1* | 10/2003 | Hayashi | 455/450 |
| 6,898,437 B1* | 5/2005 | Larsen et al. | 455/522 |
| 7,200,149 B1* | 4/2007 | Hasty, Jr. | 370/400 |
| 2002/0172186 A1* | 11/2002 | Larsson | 370/349 |
| 2003/0210680 A1* | 11/2003 | Rao et al. | 370/352 |
| 2005/0058151 A1* | 3/2005 | Yeh | 370/445 |
| 2006/0109804 A1* | 5/2006 | Wang et al. | 370/278 |
| 2006/0114867 A1* | 6/2006 | Du et al. | 370/338 |
| 2006/0161223 A1* | 7/2006 | Vallapureddy et al. | 607/60 |
| 2006/0221999 A1* | 10/2006 | Bachrach et al. | 370/465 |
| 2007/0002887 A1* | 1/2007 | Benveniste | 370/437 |
| 2007/0060098 A1* | 3/2007 | McCoy | 455/404.2 |
| 2008/0232335 A1* | 9/2008 | Del Prado Pavon et al. | 370/338 |
| 2009/0238153 A1* | 9/2009 | Sim | 370/336 |

OTHER PUBLICATIONS

Haas et al., "Dual Busy Tone Multiple Access (DBTMA)-A Multiple Access Control Scheme for Ad Hoc Networks," IEEE Transactions on Communications, 2002, vol. 50, No. 6, p. 975-985.

\* cited by examiner

| | | Receiving end | | | | |
|---|---|---|---|---|---|---|
| | | A terminal | B terminal | C terminal | D terminal | E terminal |
| Sending end | A terminal | | 8 | 8 | 0 | 9 |
| | B terminal | 8 | | 0 | 0 | 0 |
| | C terminal | 8 | 0 | | 8 | 9 |
| | D terminal | 0 | 0 | 8 | | 6 |
| | E terminal | 9 | 0 | 8 | 7 | |

FIG. 14

| Origin | Destination | Route (O: sending directly is possible) |
|---|---|---|
| A | B | O |
| A | C | O,E |
| A | D | C,EC |
| A | E | O,C |
| B | A | O |
| B | C | A,AE |
| B | D | AC,AEC |
| B | E | A,AC |
| C | A | O,E |
| C | B | A,EA |
| C | D | O |
| C | E | O,A |
| D | A | C,CE |
| D | B | CA,CEA |
| D | C | O |
| D | E | C |
| E | A | O,C |
| E | B | A,CA |
| E | C | O,A |
| E | D | C |

RADIO NETWORK SYSTEM, RADIO COMMUNICATION METHOD, AND RADIO COMMUNICATION DEVICE

This application is a U.S. national phase application of PCT International application PCT/JP2006/316685.

TECHNICAL FIELD

The present invention relates to a radio network system (wireless network system) a user uniquely operates in a frequency band that does not require a license used in a wireless LAN system and the like.

BACKGROUND ART

In a wireless LAN system conforming to IEEE802.11 standard, access control employs a CSMA/CA (Carrier Sense Multiple Access with Collision Avoidance) method. In its basic access procedure, that is, a decentralized management communication mode, each station detects the status of use of a wireless channel and determines the timing of sending data autonomously. In other words, each wireless station that wants to send data confirms the status of use of a wireless channel by performing carrier sense and postpones sending data so as to avoid a collision while sending from other wireless station is carried out.

However, stations that are out of their signal reachable areas cannot perform carrier sense, so that a collision occurs. Such a problem is known as a so-called "hidden terminal" problem. In order to avoid such a collision, it is known to use an RTS (Request To Send)/CTS (Clear To Send) method for reserving a channel by using a control message, that is, a handshake protocol. In this method, a sending station that wants to send data sends an RTS signal to a receiving station, and the receiving station replies a CTS signal to the sending station so as to permit the sending station to send data. Thus, since all adjacent stations of the sending station and the receiving station can be notified that the wireless channel is used, the collision frequency can be reduced.

On the other hand, in the CSMA/CA method, when an adjacent station performs carrier sense and it is judged that a wireless channel is used, the adjacent station cannot carry out sending. This is known as a so-called "exposure terminal (exposed terminal) problem."

FIG. 15 is a plan layout view showing wireless communication devices (wireless terminals) in a conventional wireless network system. This system includes A terminal 301, B terminal 302, C terminal 303 and D terminal 304. It also includes signal reachable area 311 of B terminal 302 and signal reachable area 312 of A terminal 301. While A terminal 301 sends data to B terminal 302, since C terminal 303 performs carrier sense of a signal sent by A terminal 301, sending to D terminal 304 is suppressed. However, actually, even if C terminal 303 sends a signal to D terminal 304, since the signal sent by C terminal 303 does not reach B terminal 302, the signal can be sent without occurring a collision. In this way, an adjacent terminal, which is in a position where a collision with the receiving terminal does not occur, is deprived of an opportunity of sending. Thus, the wireless transmission efficiency is deteriorated. This problem is called an exposure terminal problem.

As a technology for solving this exposure terminal problem, a DBTMA (Dual Busy Tone Multiple Access) method is known. An example of this method is disclosed in Zygmunt J. Haas et. al, "Dual Busy Tone Multiple Access (DBTMA)—A Multiple Access Control Scheme for Ad Hoc Networks", IEEE TRANSACTIONS ON COMMUNICATIONS, 2002, VOL. 50, NO. 6, p. 975-985. The DBTMA method uses two out-of-band busy tones in order to notify the adjacent stations that a wireless channel is used. One of the busy tones shows a send busy state another shows a receive busy state. The frequencies of these two busy tones are largely apart from each other in order to avoid interference.

FIG. 16 is a timing chart showing an operation of each radio communication device (wireless communication device) in a conventional wireless network system using the DBTMA method. Provided that each terminal of this system is in the same position as each terminal of the system shown in FIG. 15, an operation thereof is described with reference to FIGS. 15 and 16 hereinafter.

A terminal 301 sends RTS signal 501 and send busy signal 1601 at the same timing. B terminal 302 receives RTS signal 501 and sends receive busy signal 1602 when B terminal 302 is ready to receive data. When A terminal 301 receives receive busy signal 1602 and judges that B terminal 302 is ready to receive data, A terminal 301 sends only data 503 without sending send busy signal 1601. B terminal 302 continues to send receive busy signal 1602 until receiving of data 503 is completed.

With such an operation, since a terminal in signal reachable area 311 of B terminal 302 refrains from sending data, a collision can be avoided. A terminal such as C terminal 303 that is in signal reachable area 312 of A terminal 301 and out of signal reachable area 311 of B terminal 302 detects neither receive busy signal 1602 of B terminal 302 nor send busy signal 1601 of A terminal 301. Therefore, such a terminal can start to send data to D terminal 304, so that an exposed terminal problem can be avoided.

In a conventional technology, however, it is necessary to provide a band for busy tones out of the band of a signal and the layout of frequency is limited. As a result, the configuration of a sending and receiving device becomes complicated. Furthermore, depending upon the state of a propagation path, a busy tone may disappear due to a multipath wave, so that a station may mistake that sending can be carried out and sends a signal. Such a signal collides with a signal received by an adjacent station, resulting in deteriorating the transmission efficiency. Furthermore, the conventional technology assumes that a collision does not occur and does not consider the replay of an Ack (Acknowledgement) signal. Therefore, in a harsh wireless environment in which fading and the like occurs, an effective automatic retransmission cannot be applied, thus deteriorating the transmission efficiency.

SUMMARY OF THE INVENTION

A wireless network system (hereinafter, referred to as "WNS") of the present invention includes a first terminal for sending a request-to-send signal including information on a medium use period to a second terminal before sending data, receiving a clear-to-send signal from the second terminal, and sending the data to the second terminal during the medium use period; the second terminal for receiving the request-to-send signal and sending the clear-to-send signal; a third terminal for receiving the request-to-send signal and sending data to a fourth terminal during the medium use period; and the fourth terminal. According to this configuration, data can be sent from a terminal that has been conventionally an exposure terminal, thus enabling a wireless transmission efficiency to be improved.

Furthermore, in the WNS of the present invention, it is preferable that the third terminal is in an area that cannot receive a clear-to-send signal. According to this configuration, data can be sent from a terminal that has been conventionally an exposure terminal without violating a conventional protocol.

Furthermore, in the WNS of the present invention, it is preferable that the third terminal finishes sending data during the medium use period. According to this configuration, it is possible to avoid interference due to a signal from a peripheral terminal (hidden terminal) that cannot detect data sending from the third terminal.

Furthermore, in the WNA of the present invention, it is preferable that the third terminal sends the data while avoiding a period during which the second terminal sends an acknowledgement signal to the first terminal. According to this configuration, the data from the third terminal and the acknowledgement (Ack) signal from the second terminal can be prevented from colliding with each other in the first terminal.

Furthermore, in the WNS of the present invention, it is preferable that the third terminal confirms that the fourth terminal is out of signal reachable areas of the first terminal and the second terminal, and then sends data. According to this configuration, the data from the third terminal and a signal from the first terminal or the second terminal can be prevented from colliding with each other in the fourth terminal.

Furthermore, in the WNS of the present invention, it is preferable that the third terminal has an adjacent station relation table showing a relation between a receive status of a signal from an adjacent terminal and an address of the adjacent terminal in the fourth terminal, and the third terminal confirms that the fourth terminal is out of signal reachable areas of the first terminal and the second terminal by using the adjacent station relation table. According to this configuration, the third terminal can send data by understanding the relative distance between the fourth terminal and the first to third terminals.

Furthermore, in the WNS of the present invention, it is preferable that the third terminal obtains the adjacent station relation table from the adjacent terminal before the third terminal sends the data. According to this configuration, the third terminal obtains the adjacent station relation table without affecting data sending.

Furthermore, in the WNS of the present invention, it is preferable that the receive status of a signal from the adjacent terminal shows a received electric power of the signal from the adjacent terminal. According to this configuration, it is possible to understand the receive status by using a received electric power that is a standard being compatible between WNSs.

Furthermore, in the WNS of the present invention, it is preferable that the receive status of a signal from the adjacent terminal shows a signal quality of the signal from the adjacent terminal. According to this configuration, it is possible to understand a receive status with a high accuracy by using a signal quality that is a standard capable of being detected, for example, even under conditions with interference.

Furthermore, in the WNS of the present invention, it is preferable that the signal quality of the signal from the adjacent terminal is obtained by calculating a soft decision likelihood of the signal from the adjacent terminal, correcting an error, and smoothing the soft decision likelihood when an error is not detected. According to this configuration, it is possible to obtain a more accurate signal quality.

Furthermore, in the WNS of the present invention, it is preferable that the signal quality of the signal from the adjacent terminal is an average value of values obtained from the signals from the adjacent terminal. According to this configuration, it is possible to obtain a more accurate signal quality.

Furthermore, in the WNS of the present invention, it is preferable that the third terminal sends a request-to-send signal to the fourth terminal before the third terminal sends the data to the fourth terminal; and the fourth terminal receives the request-to-send signal from the third terminal and sends a clear-to-send signal to the third terminal. According to this configuration, it is possible to prevent the interference due to a hidden terminal.

Furthermore, in the WNS of the present invention, it is preferable that the third terminal observes the signal quality of the data sent by the first terminal for an arbitrary period, and sends the data to the fourth terminal when a change amount of the signal quality of the data in the arbitrary period is not more than a predetermined value. According to this configuration, it is detected that an adjacent terminal in addition to the first terminal starts sending, thus enabling a collision with the signal to be prevented.

Furthermore, in the WNS of the present invention, it is preferable that the third terminal observes a signal quality of the clear-to-send signal sent by the second terminal, and changes a send electric power when the third terminal sends the data to the fourth terminal according to the signal quality of the clear-to-send signal. According to this configuration, the first terminal and the third terminal carry out sending simultaneously, thereby enabling the interference given to the second terminal to be reduced.

Furthermore, in the WNS of the present invention, it is preferable that a modulation multivalue number or a coding rate is changed according to the send electric power. According to this configuration, it is possible to prevent the increase of error due to the change of the send electric power.

In a radio communication method (wireless communication method) of the present invention, a first terminal sends a request-to-send signal including information on a medium use period to a second terminal; the second terminal receives the request-to-send signal and sends a clear-to-send signal to the first terminal; the first terminal receives the clear-to-send signal and sends data to the second terminal during the medium use period; and a third terminal that is out of a signal reachable area of the second terminal receives the request-to-send signal from the first terminal and sends data to a fourth terminal that is out of signal reachable areas of the first terminal and the second terminal during the medium use period. According to this configuration, data can be sent from the third terminal that has been conventionally an exposure terminal, thus enabling a wireless transmission efficiency to be improved.

A wireless communication device of the present invention includes an antenna for receiving a radio signal; a wireless section for converting the radio signal into a baseband signal; a baseband processing section for converting the baseband signal from analog to digital, demodulating, and outputting as receive data; an MAC section for controlling the baseband processing section and recognizing a packet of the receive data; a control section for starting to receive the packet; a receive status-address analyzing section for inputting a relation between a receive status of another signal detected by the antenna or the wireless section or the baseband section and an address of the terminal sending the other signal detected by the MAC section into the control section, when the radio signal is not received; and an adjacent station relation table storage section in which the relation is described by the control section. According to this configuration, when a radio signal is not received, the relation between the receive status and the address can be expressed in a table and stored.

According to the present invention, it is possible to prevent the occurrence of a so-called exposure terminal problem that the sending from the station can be suppressed when it is judged that a wireless channel is used. At the same time, during the communication by other stations, collisions do not occur. Furthermore, it is possible to immediately replay an Ack signal when the communication succeeds. A technology can be provided in which an efficient communication can be carried out even in a wireless transmission path environment in which fading occurs.

BRIEF DESCRIPTION OF THE DRAWINGS

FIG. 14 shows an example of a routing table a wireless communication device in a WNS in accordance with a fourth exemplary embodiment of the present invention.

REFERENCE MARKS IN THE DRAWINGS

Figure 1:
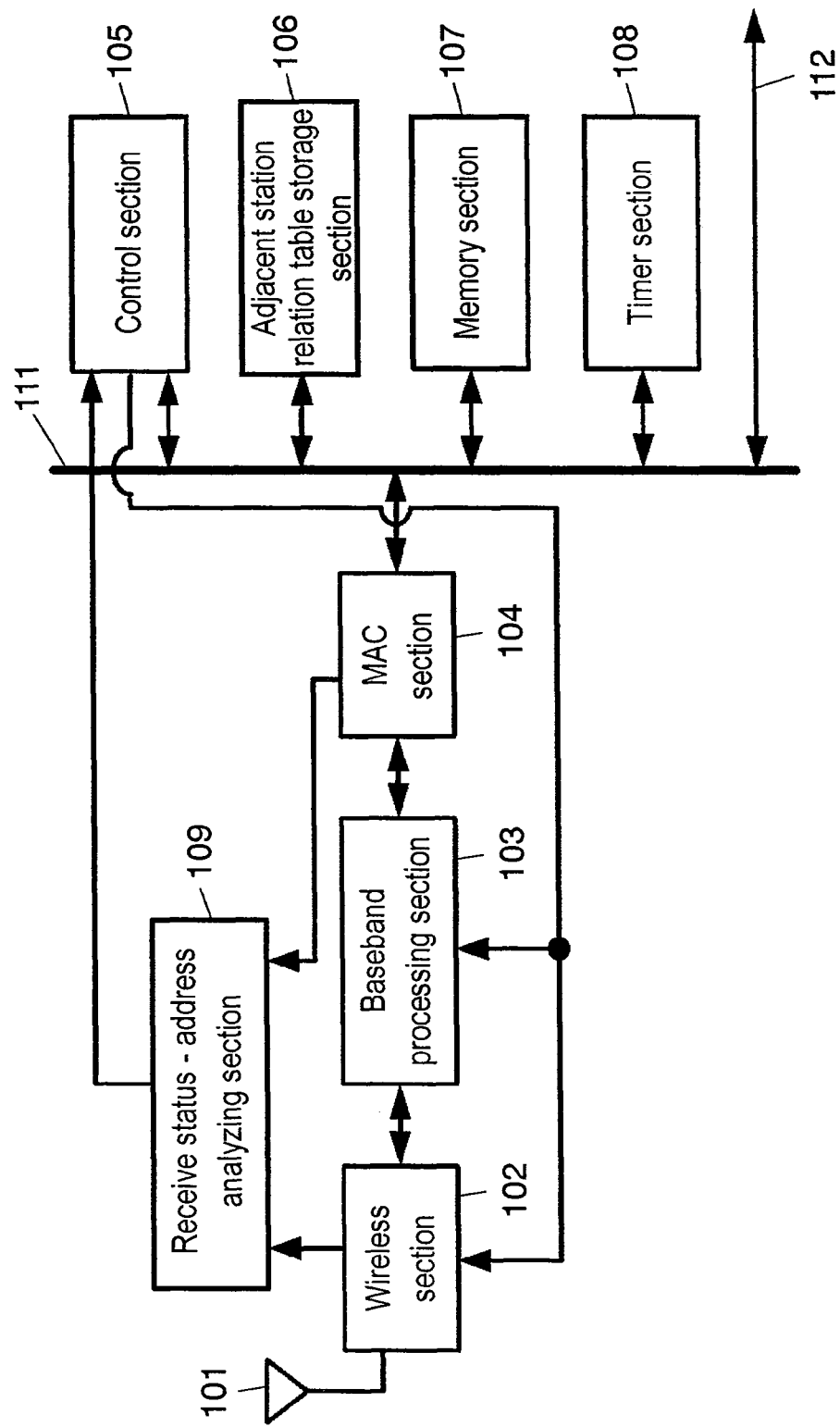
FIG. 1 is a block diagram showing a configuration of a wireless communication device in a WNS in accordance with a first exemplary embodiment of the present invention.

101 antenna
102 wireless section
103 baseband processing section
104 MAC section
105 control section
106 adjacent station relation table storage section
109 receive status-address analyzing section
301 A terminal (first terminal)
302 B terminal (second terminal)
303 C terminal (third terminal)
304 D terminal (fourth terminal)
305 E terminal (adjacent terminal)
311 signal reachable area of B terminal
312 signal reachable area of A terminal
501 RTS signal
502 CTS signal
503, 505, 601, 1201, 1202 data
504, 506, 1203 Ack signal
511 medium use period (NAV period)

DETAILED DESCRIPTION OF THE PREFERRED EMBODIMENTS

Hereinafter, exemplary embodiments of the present invention are described with reference to drawings.

First Exemplary Embodiment

FIG. 1 is a block diagram showing a configuration of a wireless communication device in a wireless network system (WNS) in accordance with a first exemplary embodiment of the present invention. This wireless communication device includes antenna 101, wireless section 102, baseband processing section 103, MAC (media access control) section 104, control section 105, adjacent station relation table storage section 106, memory section 107, timer section 108, receive status-address analyzing section 109, internal bus 111, and external interface 112.

Antenna 101 receives or sends a radio signal. Wireless section 102 converts a signal received by antenna 101 into a base band at the receiving time, and converts a baseband signal from baseband processing section 103 into a radio frequency band at the sending time. Furthermore, wireless section 102 measures a received electric power of a signal sent from other stations while own station does not carry out communication.

Baseband processing section 103 converts an analog signal into a digital signal, followed by demodulating into receive data at the receiving time; and modulates send data input from MAC section 104 and converts them into an analog signal at the sending time.

MAC section 104 recognizes a packet from a receive signal, controls baseband processing section 103, and stores the receive data in memory section 107 via internal bus 111 at the receiving time. Furthermore, MAC section 104 makes the send data stored in memory section 107 into a packet, inputs the packet into baseband processing section 103 at a predetermined timing, and controls so that the input packet is modulated and then radiated to a propagation path as a radio signal at the sending time. Furthermore, MAC section 104 detects sending station information (specifically, when each station is provided with an address, the information is an address of the sending station) of a signal sent from other stations while own station does not carry out communication.

Control section 105 controls each section of the wireless communication device, starts sending and receiving of a packet, and carries out data transfer with respect to the outside via external interface 112. Adjacent station relation table storage section 106 manages addresses and the like of other stations that are adjacent to own station.

Timer section 108 serves as a timer for state transition of this wireless communication device. In other words, timer section 108 manages various periods. For example, this timer section 108 is set to a period analyzed by MAC section 104 and is allowed to count down.

Receive status-address analyzing section 109 receives an input of signals from wireless section 102 and MAC section 104, associates the received electric power detected by wireless section 102 with a sending station address detected by MAC section 104, and outputs the result to control section 105. Then, control section 105 controls the detected sending station address and received electric power to be described in a column about the own station in adjacent station relation table storage section 106. A typical example of the address includes an MAC address. However, it is not limited to this. Examples of the address may include an IP address or a special purpose ID. Use of the IP address makes it easy to update a conventional system. Use of special purpose ID enables an address architecture suitable for a system to be constructed. Note here that these addresses can be obtained from received signals.

Furthermore, analysis objects of receive status-address analyzing section 109 may include a receive signal quality and, if the wireless communication device has a plurality of antennas 101, a coming direction of the signal, in addition to the received electric power. Of course, the analysis object may be a combination of some of them. In particular, when an exposure terminal problem is dissolved by the present invention, since the probability that signals from a plurality of terminals are present on the propagation path becomes higher than in the conventional technology, it is difficult to analyze which terminal sends the signal. Then, it is desirable to detect a signal quality-address relation by using a corrected signal and the like with a high reliability. Note here that the signal quality-address relation denotes a relation in which a received signal and an address of a station that sends the received signal are uniformly associated with each other. The signal quality can be detected by baseband processing section 103, and the coming direction can be detected by antenna 101 or baseband processing section 103.

Figure 2:
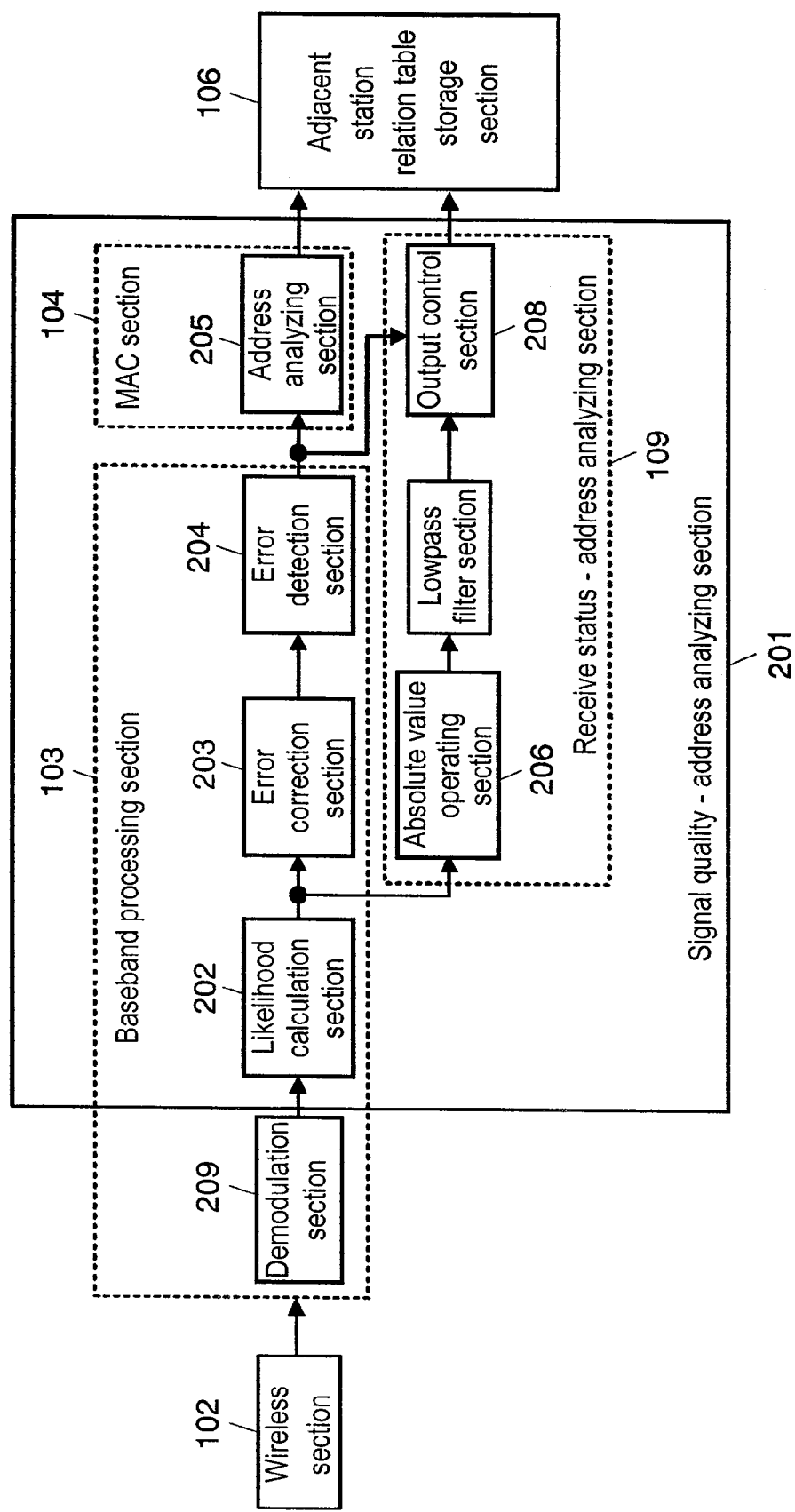
FIG. 2 is a block diagram showing a configuration of a signal quality-address analyzing section of the wireless communication device shown in FIG. 1.

FIG. 2 is a block diagram showing a configuration of the signal quality-address analyzing section of the wireless communication device in accordance with the first exemplary embodiment of the present invention. The configuration shown in this figure may be obtained by reconstructing baseband processing section 103, MAC section 104, and receive status-address analyzing section 109. Signal quality-address analyzing section 201 includes likelihood calculation section 202, error correction section 203, error detection section 204, address analyzing section 205, absolute value operating section 206, lowpass filter section 207, and output control section 208. Likelihood calculation section 202 calculates a soft decision likelihood with respect to a bit of a signal from demodulation section 209 that is a part of baseband processing section 103. Note here that the output from likelihood calculation section 202 is assumed to be bipolar. In other words, when the probability of bit zero is equal to that of bit one, the likelihood is zero. When the probability of bit one is higher, a negative value is output and, when the probability of bit zero is higher, a positive value is output. Note here that the positive and negative values may be opposite.

Error correction section 203 receives an input of the calculated likelihood and corrects an error. Error detection section 204 checks whether or not an error occurs in the received signal by carrying out Cyclic Redundancy Check (CRC), and the like. When an error is detected, the data are discarded. When an error is not detected, address analyzing section 205 obtains an MAC address and the like, and outputs it to adjacent station relation table storage section 106.

Absolute value operating section 206 calculates an absolute value of the output of likelihood calculation section 202. Lowpass filter section 207 smoothes the output of likelihood calculation section 202. Output control section 208 outputs a signal quality to adjacent station relation table storage section 106 when an error is not detected by error detection section 204 as mentioned above. With the use of the error corrected signal in this way, the signal quality-address relation can be detected with a high reliability.

Note here that the bit accuracy of the soft decision likelihood for correcting an error is generally not so large as 3 to 5 bits. However, when the bit accuracy of the soft decision likelihood for detecting a signal quality in the first exemplary embodiment is larger than the general 3 to 5 bits, the detection accuracy can be improved. Furthermore, when one having the same address is detected a plurality of times and the detected values are averaged, the detection accuracy can be further improved.

Figures 3, 4:
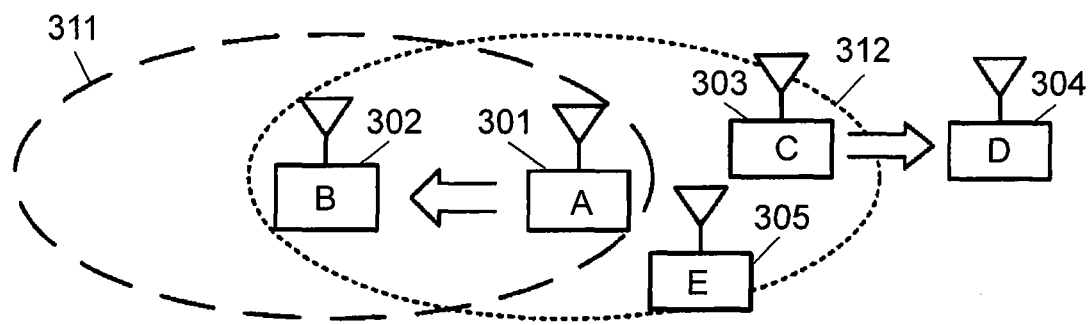
FIG. 3 is a plan layout view showing the wireless communication device shown in FIG. 1.
FIG. 4 shows an example of an adjacent station relation table of the wireless communication device shown in FIG. 1.

FIG. 3 is a plan layout view showing the wireless communication device in accordance with the first exemplary embodiment. This system includes A terminal 301, B terminal 302, C terminal 303, D terminal 304 and E terminal 305. It also includes signal reachable area 311 of B terminal 302 and signal reachable area 312 of A terminal 301. E terminal 305 is also included in signal reachable area 312 of A terminal 301.

FIG. 4 shows an example of an adjacent station relation table stored in adjacent station relation table storage section 106 of the wireless communication device in accordance with the first exemplary embodiment. It shows a receive status in the layout of the wireless terminals shown in FIG. 3. Herein, in order to analyze the receive status, a received electric power is used and it is classified into ten levels from zero to nine. The maximum received electric power is defined as nine. Since the received electric power has a duality between the sending end and the receiving end to some extent, in a case where the sending terminal and the receiving terminal are exchanged with each other, substantially the same values are obtained. Note here that a method for forming the adjacent station relation table is described later.

From the adjacent station relation table shown in FIG. 4, it is shown that when levels 0 to 3 are defined as being out of the signal reachable area, C terminal 303 to E terminal 305 are present out of signal reachable area 311 of B terminal 302, and D terminal 304 is out of signal reachable area 312 of A terminal 301.

In other words, it can be confirmed that when A terminal 301 sends data to B terminal 302, even if C terminal 303 and D terminal 304 are communicated with each other, a collision does not occur.

In forming the adjacent station relation table, each station needs to share the result of each receive status-address analysis. As a sharing method, it is possible to apply a proactive type (which is also referred to as a table-driven type and the like), which is used as an ad hoc network routing protocol.

In other words, each station on the network maintains updated receive status-address information from all other stations. Each station has a table for storing receive status-address information and transmits updated information to entire network in response to the change of network topology. By using a form in which an algorithm that is the same as the routing protocol is used and the receive status-address information is also stored as one of the parameters of the routing table, it is possible to minimize the increase of processing load.

Furthermore, another method for forming an adjacent station relation table may be a method of exchanging receive status-address information with each other in only adjacent stations. Since each station forms a necessary minimum adjacent station relation table, it is possible to save a transmission cost and a time cost spent on sharing information. A method of exchanging information may be a method of exchanging information regularly and may be a method of exchanging information only when the information is changed. Furthermore, the combination thereof may be employed.

As another method for forming an adjacent station relation table, based on the communication between an access point and each terminal as an infrastructure mode of a wireless LAN system, a method of notifying the receive status-address information obtained by each terminal to an access point, forming an adjacent station relation table based on the information collected by the access point and broadcasting it to each terminal may be employed. This method facilitates the formation control of an adjacent station relation table.

Note here that it is not necessary to store all the obtained adjacent station relation tables. It is sufficient to store only information of the stations located adjacent to own station. Furthermore, information of only stations, which may be a destination among the stations located adjacent to own station, may be stored. In particular, this is effective when the adjacent stations belong to other networks and there is not probability of directly sending data thereto.

Figure 5:
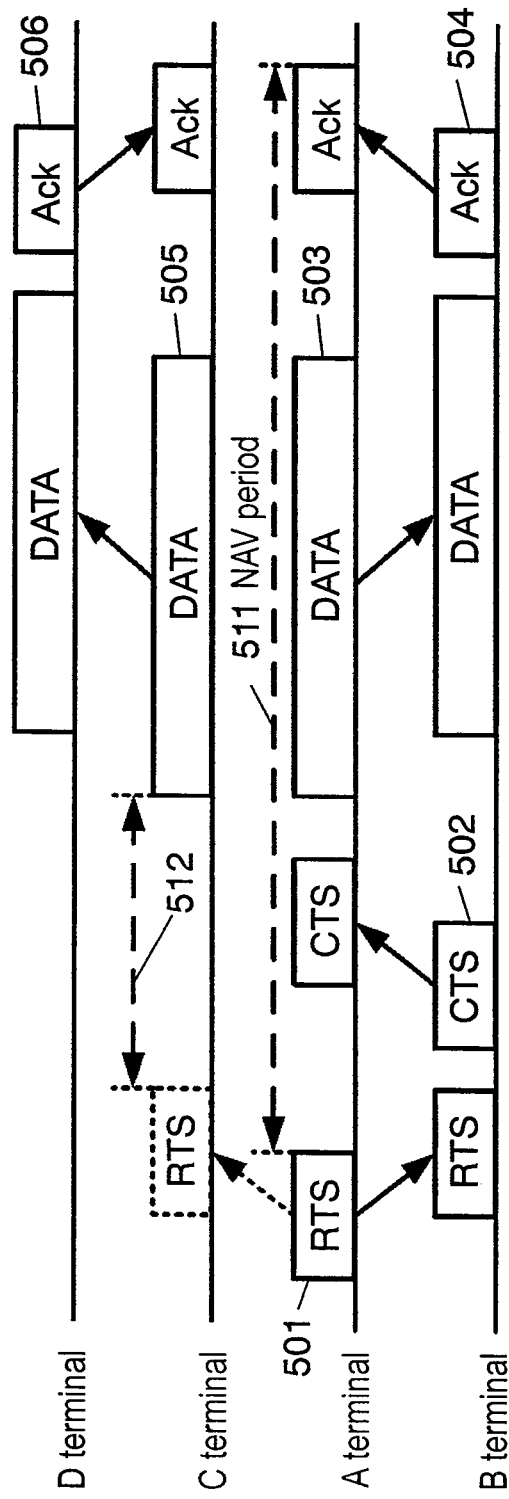
FIG. 5 is a timing chart showing an operation of each wireless communication device shown in FIG. 1.

FIG. 5 is a timing chart showing an operation of each wireless communication device in accordance with the first exemplary embodiment. FIG. 5 shows an operation in which C terminal 303 sends data 505 to D terminal 304 concurrently with an operation in which A terminal 301 sends data 503 to B terminal 302. A plan layout of each terminal is the same as shown in FIG. 3.

Herein, when A terminal 301 sends RTS signal 501, B terminal 302 and C terminal 303 receive RTS signal 501, respectively. When B terminal 302 is ready to receive data, it sends CTS signal 502 and A terminal 301 receives CTS signal 502. Then, A terminal 301 sends data 503 by RTS signal 501/CTS signal 502 during a period set by NAV (Network Allocation Vector) (hereinafter, referred to as an NAV period or a medium use period) 511. Note here that the setting of the NAV period is carried out by MAC 104 shown in FIG. 1.

B terminal 302 carries out error detection of a signal received as data 503 and it replies Ack signal 504 when an error is not detected. When A terminal 301 receives Ack signal 504, a series of communication is completed. A terminal 301 and B terminal 302 return to an idle state.

In a conventional technology, C terminal 303 receiving RTS signal 501 from A terminal 301 recognizes an NAV signal in RTS signal 501 and refrains from sending data during NAV period 511 even if there are data to be sent to D terminal 304. Therefore, C terminal 303 was an exposed terminal. However, in the present invention, when C terminal 303 sends data 505 to D terminal 304, it checks whether or not the sending affects B terminal 302 during period 512 by using the adjacent station relation table and confirms whether or not B terminal 302 is out of signal reachable area of C terminal 303. When it is judged that B terminal 302 is out of signal reachable area of C terminal 303 and that the sending does not affect B terminal 302, C terminal 303 sends data 505 to terminal 304.

Herein, the first exemplary embodiment assumes that while MAC section 104 of C terminal 303 is waiting in order to send data to D terminal 304, it receives RTS signal 501 of A terminal 301. C terminal 303 analyzes the received RTS signal 501 in MAC section 104 and understands NAV period 511 between A terminal 301 and B terminal 302. Furthermore, C terminal 303 obtains receive status-address information of D terminal 304 from adjacent station relation table storage section 106 and examines whether or not D terminal 304 is in signal reachable areas 312 and 311 of A terminal 301 and B terminal 302. As a result, from the hatched portion of the adjacent station relation table shown in FIG. 4, it can be confirmed that D terminal 304 is not in signal reachable areas 312 and 311 of A terminal 301 and B terminal 302.

Then, C terminal 303 estimates the capacity of data that can be sent during NAV period 511, reads out data for D terminal 304 of the capacity of data that can be sent from memory section 107 shown in FIG. 1, converts the data into a send data format in MAC section 104, and sends as data 505 from antenna 101 via baseband converting section 103 and wireless section 102. When an error is not detected in receive data 505, D terminal 304 replies Ack signal 506. Then, when C terminal 303 receives Ack signal 506, a series of communication is completed, and C terminal 303 and D terminal 304 return to an idle state.

Herein, Ack signal 504 from B terminal 302 to A terminal 301 and Ack signal 506 from D terminal 304 to C terminal 303 are sent and received substantially simultaneously. However, A terminal 301 is out of the signal reachable area of D terminal 304. Since C terminal 303 is out of signal reachable area 311 of B terminal 302, both signals do not collide with each other. Thus, when send data are transmitted successfully, Ack signals 504 and 506 can be replied immediately. Furthermore, in a wireless propagation path in which an error tends to occur, it is possible to carry out effective automatic retransmission easily.

When an RTS signal and a CTS signal are allowed to send in the communication from C terminal 303 to D terminal 304, although the payload of data is reduced, it is possible to prevent interference due to a hidden terminal as much as possible. In an environment in which the number of terminals large and the traffic is heavy, the deterioration of the transmission efficiency can be prevented.

Herein, when control is carried out whether or not the RTS signal is sent in accordance with NAV period 511, it is possible to prevent the deterioration of the transmission efficiency when data with a small capacity are sent. Furthermore, when the urgency or capacity of send data in C terminal 303 and NAV period 511 and the like are understood and when urgency is low and NAV period 511 is short, control is carried out so as to refrain from sending. Thus, it is not necessary to frequently switch between operation and stop of the wireless communication device, thus enabling power consumption to be reduced.

Herein, it is assumed that E terminal 305 shown in FIG. 3 is also in a state of waiting in order to send data to D terminal 304. In this case, when E terminal 305 carries out the same processing as C terminal 303 and sends data, data from C terminal 303 and data from E terminal 305 collide with each other in the wireless propagation path, so that the communication with D terminal 304 is not established. Furthermore, even if C terminal 303 sends an RTS signal before sending data, E terminal 305 cannot distinguish it from RTS signal 501 of A terminal 301, and it cannot detect the RTS signal. Therefore, as carried out in a conventional wireless LAN system, C terminal 303 and E terminal 305 are preferably provided with a back-off function in which sending is started after a random time of waiting.

Figure 6:
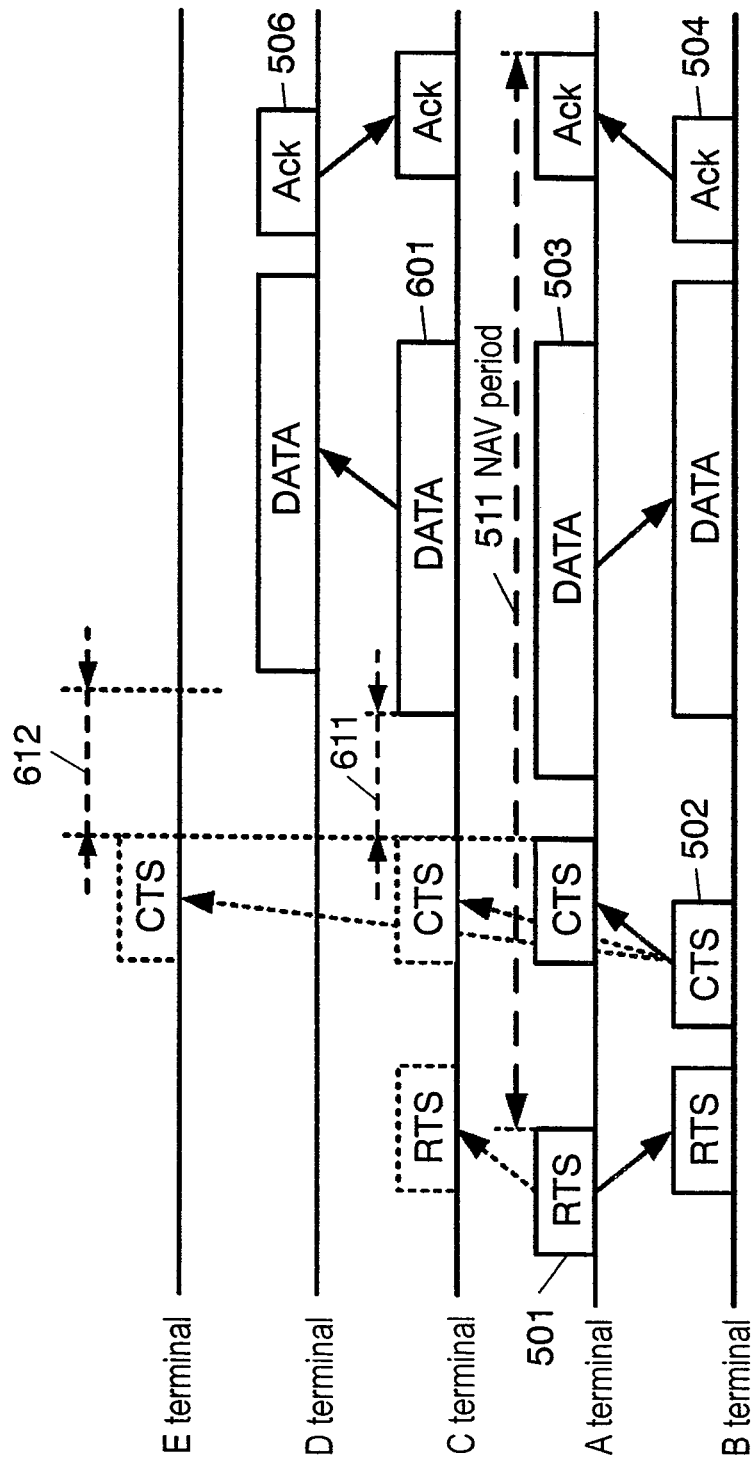
FIG. 6 is a timing chart showing another operation of each wireless communication device shown in FIG. 1.

FIG. 6 is another timing chart showing an operation of each wireless communication device in accordance with the first exemplary embodiment. FIG. 6 shows an operation in which back-off time 611 is provided and C terminal 303 sends data 601 to D terminal 304 concurrently with an operation in which A terminal 301 sends data 503 to B terminal 302.

C terminal 303 and E terminal 305 do not start sending data immediately after they receive CTS signal 502 that is an extremely small received electric power from B terminal 303 that is present out of the signal reachable areas, but they refrain from sending for an independently set random time.

Herein, the extremely small amount of received electric power means an electric power that is not larger than the receiver sensitivity out of the signal reachable area.

In this case, C terminal 303 refrains from sending for back-off time 611, and E terminal 305 refrains from sending for back-off time 612. In these periods, in a conventional technology, the wireless terminal simply performs carrier sense. However, it is desirable that C terminal 303 and E terminal 305 in the first exemplary embodiment can detect data sending from the adjacent terminal and the like in addition to the detection of data sending 503 by A terminal 301. Then, in the case where data sending from the adjacent terminal is detected, the sending is postponed for a back-off time.

Figure 7:
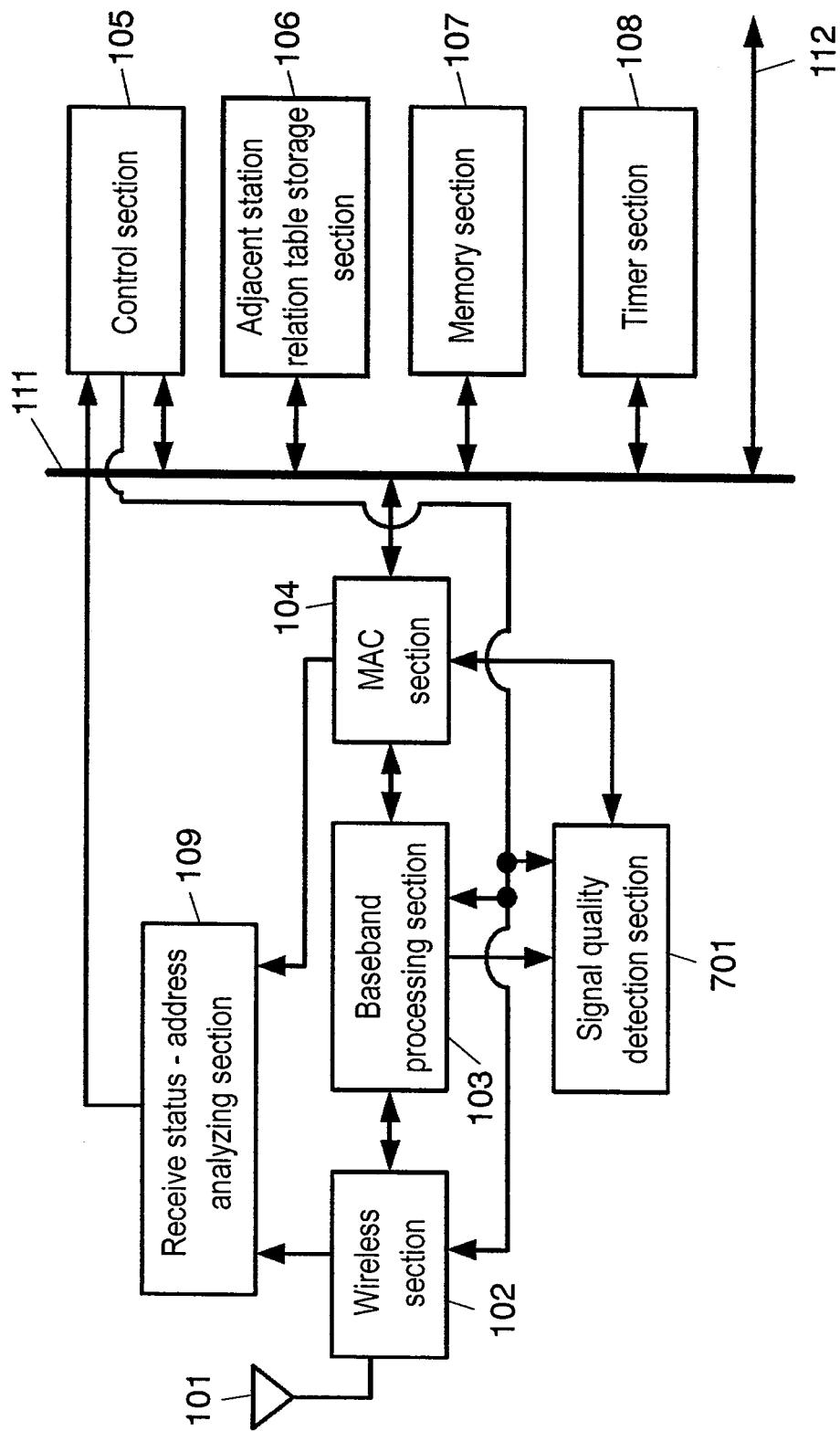
FIG. 7 is a block diagram showing another configuration of the wireless communication device shown in FIG. 1.

FIG. 7 is a block diagram showing another configuration of the wireless communication device in accordance with the first exemplary embodiment. The wireless communication device includes antenna 101, wireless section 102, baseband processing section 103, MAC section 104, control section 105, adjacent station relation table storage section 106, memory section 107, timer section 108, receive status-address analyzing section 109, signal quality detection section 701, internal bus 111, and external interface 112.

The wireless communication device shown in FIG. 7 includes signal quality detection section 701 so as to observe whether or not a signal quality is changed during back-off times 611 and 612.

In other words, a signal (for example, a likelihood that is a distance from an ideal signal point) from baseband processing section 103 is input, and when it is rapidly deteriorated, it is judged not to be caused by the simple change of the propagation path but to be because an adjacent terminal that was an exposed terminal in a conventional technology starts sending data. Then, at least during NAV period 511 set by A terminal 301, sending is postponed.

In a conventional technology, when RTS signal 501 from A terminal 301 is received, terminals that are not to be received can be controlled to stop a receiving operation for only NAV period 511 so as to prevent the power consumption. In the first exemplary embodiment of the present invention, a terminal that wants to send data during NAV period 511 receives signals from A terminal 301 during at least back-off times 611 and 612 and monitors the quality thereof.

Figure 8:
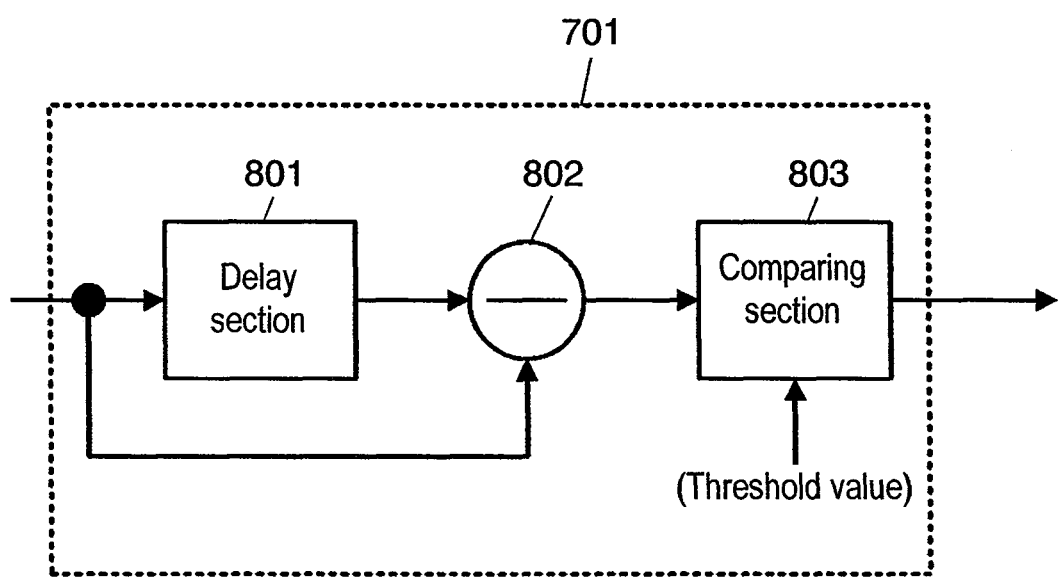
FIG. 8 is a block diagram showing a configuration of a signal quality detection section of the wireless communication device shown in FIG. 1.

FIG. 8 is a block diagram showing a configuration of signal quality detection section 701 of the wireless communication device in accordance with the first exemplary embodiment. Signal quality detection section 701 includes delay section 801, subtracting section 802 and comparing section 803.

In signal quality detection section 701, the result of subtracting operation of a signal from baseband processing section 103 and a signal obtained by delaying the signal from baseband processing section 103 by delay section 801 in subtracting section 802 is compared with the threshold in comparing section 803. Then, the comparison result is input into MAC section 104. When the subtraction result is not less than the threshold value, the likelihood is rapidly reduced, and it can be regarded that the signal quality is deteriorated. That is to say, it is judged that in addition to A terminal 301 sending RTS signal 501, another terminal starts sending data. Note here that since it is sufficient that signal quality detection section 701 operates only for back-off times 611 and 612, it operates based on the instruction from MAC section 104.

Note here that the configuration of signal quality detection section 701 is thought to include various configurations other than the above-mentioned configuration. An example of the configuration includes means for judging whether or not the received electric power in wireless section 102 is rapidly increased, and means for judging whether or not the correlation between antennas or the distribution of the coming direction of a radio signal in the case where a wireless communication device have a plurality of antennas.

Figure 9:
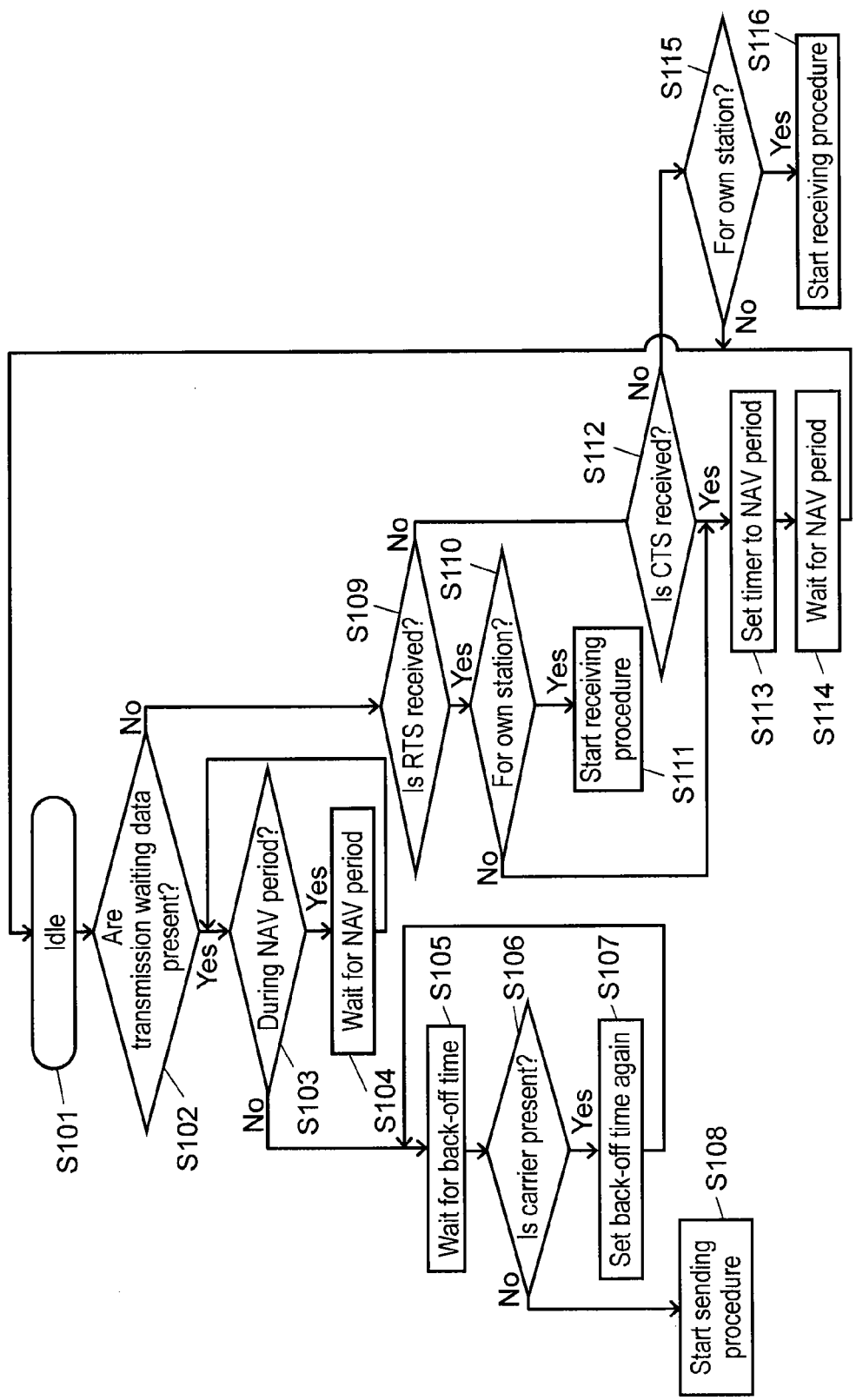
FIG. 9 is a flowchart showing an operating procedure of a wireless communication device in a conventional WNS as a comparative example.

FIG. 9 is a flowchart showing an operating procedure of a wireless communication device in a conventional WNS as a comparative example. Firstly, in an idle state (step S101), it is determined whether or not transmission waiting data are present. When the transmission waiting data are present (Yes in step S102), it is determined whether or not an NAV period is set by an RTS/CTS signal from another terminal by checking the value of timer section 108 (timer section 108 is set to an NAV period analyzed by MAC section 104 and is allowed to count down).

As a result, during a NAV period (Yes in step S103), the procedure waits until the NAV period is finished (step S104) and thereafter, returns to step S103. It is determined again whether or not a NAV period is set. On the other hand, not during a NAV period (No in step S103), the procedure waits for a back-off time set by a random value (step S105), and then carrier sense is performed. When carrier is present (Yes in step S106), a back-off time is set again (step S107) and the procedure returns to step S105. When carrier is not present (No in step S106), sending procedure is started (step S108). In other words, when the data amount is larger than a predetermined value, data are sent in an RTS/CTS mode; and when the data amount is not larger than a predetermined value, data are sent as they are. Note here that data are sent in an RTS/CTS mode in order to prevent a hidden terminal problem, and data are sent as they are in order to save time for sending and receiving the RTS/CTS signal by allowing the hidden terminal problem to some extent. When the carrier sense is performed before sending data and carrier is detected, the procedure returns to step S103 again.

When transmission waiting data are not present (No in step S102), it is confirmed whether or not an RTS signal from other terminal is received (step S109). When an RTS signal for own station is received (Yes in step S110), a receiving procedure is started (step S111). Herein, in the case where an NAV period is set by an RTS signal or a CTS signal sent from another terminal, since receiving is prohibited, a CTS signal is not replied and the procedure returns to an idle state (step S101). However, in the case where an NAV period is not set, since receiving can be carried out, a CTS signal is replied and the procedure moves to a reception waiting state.

Then, after reception is completed, the procedure returns to an idle state again (step S01). When the RTS signal is not for own station (No in step S110), a timer is set so that sending and receiving are not carried out for the set NAV period (step S113) and procedure waits (step S114).

When an RTS signal from another terminal is not received (No in step S109), it is confirmed whether or not a CTS signal is received. When the CTS signal is received (Yes in step S112), since data may be sent from another terminal, a timer is set to the NAV period (step S113) and the procedure waits until the NAV period is finished (step S114). On the other hand, when the CTS signal is not received (No in step S112), it is confirmed whether or not data for own station are present. When data for own station are present (Yes in step S115), it is thought that data are sent not in the RTS/CTS mode but directly sent, and receiving procedure is started immediately (step S116). After receiving is completed, the procedure returns to an idle state again (step S101). When data for own station are not present (No in step S115), the procedure returns to an idle state (step S101) and a series of flow is repeated.

Figure 10:
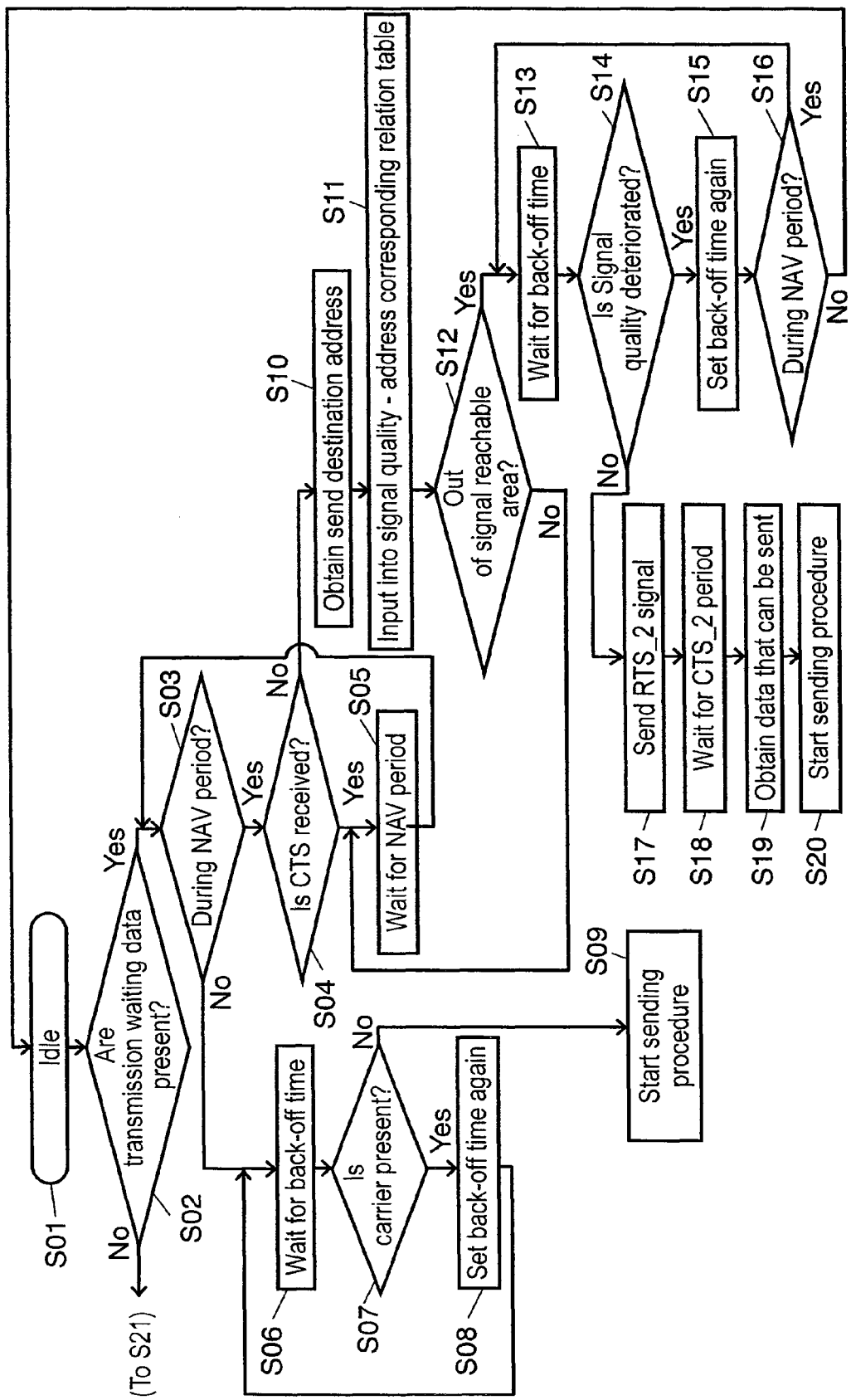
FIG. 10 is a flowchart showing an operating procedure of the wireless communication device shown in FIG. 1.
Figure 11:
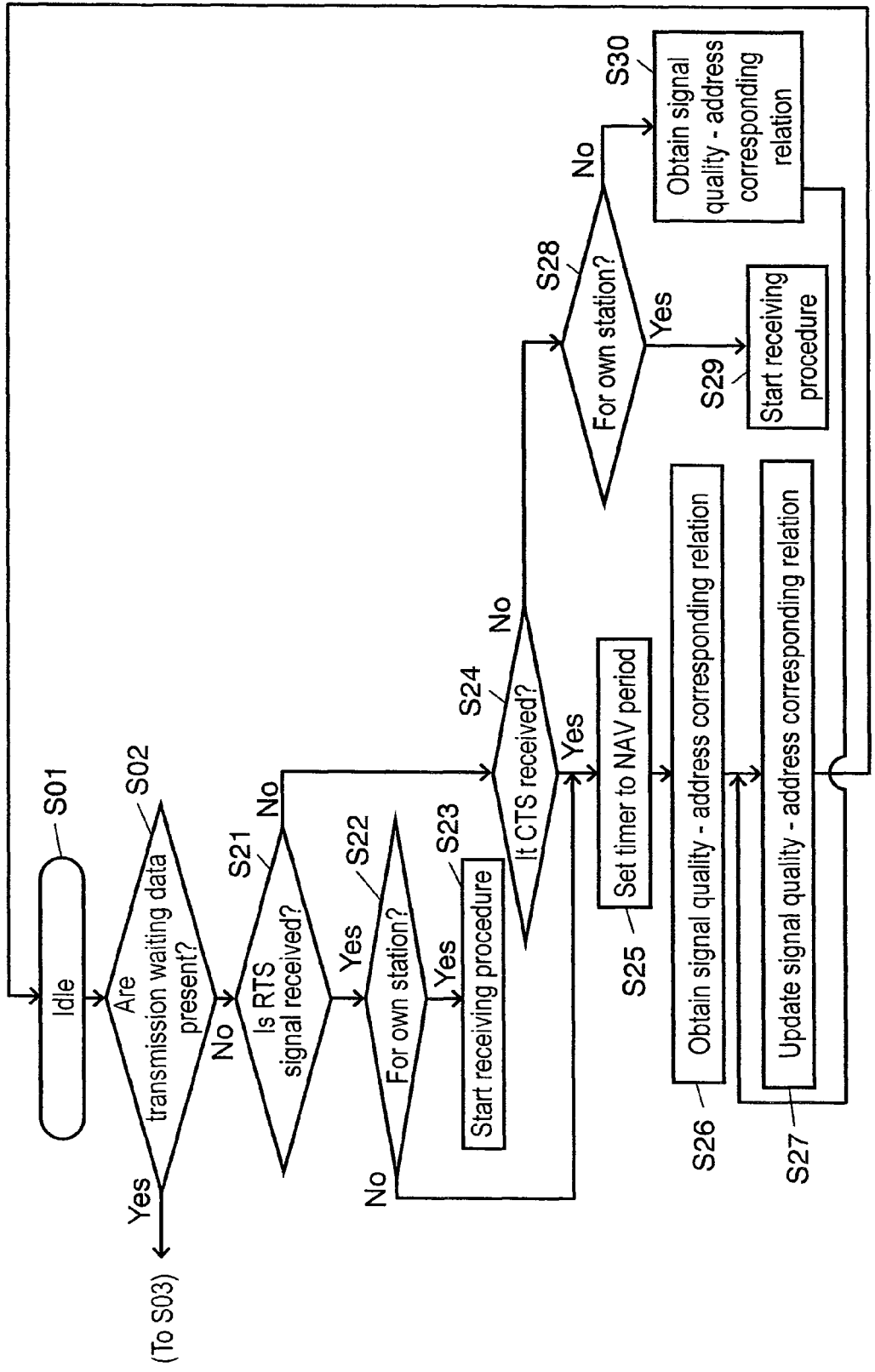
FIG. 11 is a flowchart showing another operating procedure of the wireless communication device shown in FIG. 1.

FIGS. 10 and 11 are a flowchart showing an operating procedure of the wireless communication device of the WNS in the first exemplary embodiment, respectively. FIG. 10 show an operating procedure when transmission waiting data are present, and FIG. 11 shows an operating procedure when transmission waiting data are not present.

Similar to a conventional procedure, in FIG. 10, in an idle state (step S01), firstly, it is determined whether or not transmission waiting data are present. When the transmission waiting data are present (Yes in step S02), it is determined whether or not an NAV period is set by an RTS/CTS signal from another terminal by checking the value of timer section 108. As a result, not during the NAV period (No in step S03), steps S06 to S09 are executed the same as in steps S105 to S108 of a conventional technology.

In FIG. 11, when the transmission waiting data are not present (No in step S02) and an RTS signal for own station is received, steps S21 to S23 are executed the same as in steps S109 to S111 of a conventional technology.

Furthermore, when an RTS signal from another terminal is not received (No in step S21), it is determined whether or not a CTS signal is received. When the CTS signal is received (Yes in step S24), a timer is set to the NAV period (step S25), a corresponding relation between the quality of the received signal and the address is obtained (step S26) until the NAV period is finished, and the content of a previously obtained corresponding relation table is updated (step S27). Thereafter, the procedure returns to an idle state (step S01).

On the other hand, when a CTS signal is not received (No in step S24), it is confirmed whether or not data for own station are present and when data for own station are present (Yes in step S28), it is thought that the data are sent not in an RTS/CTS mode but directly sent, and a receiving procedure is started immediately (step S29). After receiving is completed, the procedure returns to an idle state again (step S01). When data are not for own station (No in step S28), similar to step S26, a corresponding relation between the signal quality of the received signal and an address is obtained (step S30), and the corresponding relation table is updated (step S27).

Furthermore, in FIG. 10, a NAV period is set in step S03 (Yes in step S03), it is determined whether or not a CTS signal can be received subsequently. When it was determined that the CTS signal can be received (Yes in step S04), if a signal is sent, interference is given to the receiving station and a collision occurs. Therefore, the procedure waits until the NAV period is finished (step S05). Thereafter, the procedure returns to step S03. On the other hand, when it was determined that a CTS signal cannot be received (No in step S04), even if a signal is sent, a collision does not occur in the receiving station. Firstly, a destination address of the transmission waiting data is obtained (step S10). Subsequently, the destination address is input into the signal quality-address corresponding relation table that has been updated in step S27 (step S11), and it is determined whether or not the destination station is out of a signal reachable area of an RTS signal sending station. As a result of the determination, when the destination station is in the signal reachable area (No in step S12), it is judged that even if a signal is sent, it collides with a signal from the RTS sending station and communication does not succeed. Thus, the procedure waits until the NAV period is finished (step S05).

When the destination station is out of the signal reachable area of the RTS signal sending station (Yes in step S12), it means that the own station is an exposed terminal. Even if transmission waiting data are sent, a collision does not occur and the probability that communication succeeds is high. Then, in order to avoid a collision with other adjacent exposed terminals, while the procedure waits for a back-off time set by a random value (step S13), the state of the quality of the received signal is detected. Subsequently, it is determined whether or not the signal quality is deteriorated. When the signal quality is deteriorated (Yes in step S14), it is thought that another adjacent exposed terminal starts sending earlier. Then, the back-off time is set again (step S15). During the NAV period (Yes in step S16), the procedure waits for a back-off time (step S13). Not during the NAV period, the procedure returns to an idle state again (step S01).

When the signal quality is not deteriorated (No in step S14), it is thought that own station obtains a right to send data earlier than other exposed terminals. Then, the procedure waits for a period during which an RTS_2 signal is sent (step S17) and a CTS_2 signal is replied (step S18). Actually, since the CTS_2 signal interferes with data from the RTS signal sending station, it cannot be received. However, in order to prevent a station adjacent to a CTS_2 signal sending station from becoming a hidden terminal, the CTS_2 signal is allowed to reply. Subsequently, data that can be sent are obtained in the remaining NAV period (step S19) and the obtained data are sent (step S20).

Note here that when the signal quality is not deteriorated (No in step S14), it is possible to send data immediately without sending RTS_2 and CTS_2 signals. In this case, the transmission efficiency is improved.

Herein, when C terminal 303 carries out sending at the same time as A terminal 301, in B terminal 302 receiving a signal from A terminal 301, an interference electric power is increased although it is slight. When B terminal 302 is a multi-antenna, it cannot be denied that receiving may not be carried out with an optimum antenna weight due to the above-mentioned interference electric power. Therefore, C terminal 303 had better refrain from sending data only while B terminal 302 receives a preamble signal for estimating a transmission path for determining the antenna weight.

Second Exemplary Embodiment

Figure 12:
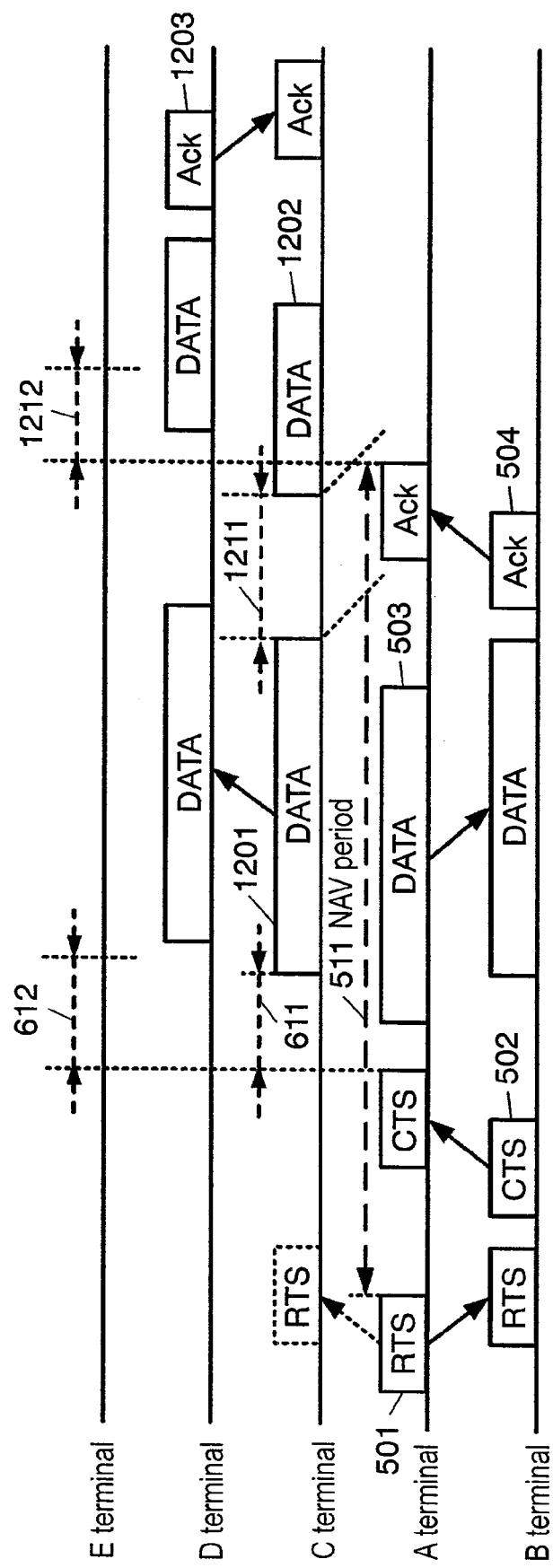
FIG. 12 is a timing chart showing another operation of each wireless communication device in a WNS in accordance with a second exemplary embodiment of the present invention.

FIG. 12 is a timing chart showing an operation of each wireless communication device in a WNS in accordance with a second exemplary embodiment of the present invention. This shows a case where C terminal 303 sends data whose length is longer than that of NAV period 511 set by A terminal 301. C terminal 303 interrupts data sending in period 1211 corresponding to timing in which Ack signal 504 is received in A terminal 301 so that Ack signal 504 reaches between A terminal 301 and B terminal 302.

NAV period 511 includes a time until Ack signal 504 reaches A terminal 301, and a period between a time obtained by subtracting the time length of Ack signal 504 from an end time of NAV period 511 and a time length of Ack signal 504 corresponds to period 1211.

In FIG. 12, Ack signal 504 received by A terminal 301 and data 1202 sent by C terminal 303 are overlapped with each other. However, since data 1202 of C terminal 303 takes a time to reach A terminal 301, when data 1202 of C terminal 303 reaches A terminal 301, A terminal 301 has already finished receiving Ack signal 504.

Furthermore, since the time at which Ack signal 504 reaches A terminal 301 varies depending upon the distance between A terminal 301 and B terminal 302 or a terminal configuration, a time is further taken before and after period 1211 or period 1211 is shifted. Thus, a collision does not occur.

In C terminal 303, in order to show that data 1201 before sending is interrupted and data 1202 after sending is restarted are continuous data, information showing that they are continuous data is described in the header at the top of the data and the like, and thereby the receiving operation in D terminal 304 becomes easy. D terminal 304 receives data 1201 and data 1202 and detects an error. When an error is not detected, D terminal 304 replies Ack signal 1203 immediately. C terminal 303 receives Ack signal 1203 from D terminal 304. Thus, a series of communication operation is completed.

On the other hand, E terminal 305, which is adjacent to C terminal 303 and is an exposed terminal, refrains from sending data for random time 612 and detects a signal quality. As a result, the signal quality is deteriorated. E terminal 305 understands that adjacent C terminal 303 acquires sending right and refrains from sending data only for NAV period 511. Thereafter, it refrains from sending for random time 1212 again and performs carrier sense. Then, since data are sent from C terminal 303, carrier is detected. Since E terminal 305 sets a random time again and refrains from sending data until carrier is not detected, a collision does not occur during communication from C terminal 303 to D terminal 304.

Third Exemplary Embodiment

Figure 13:
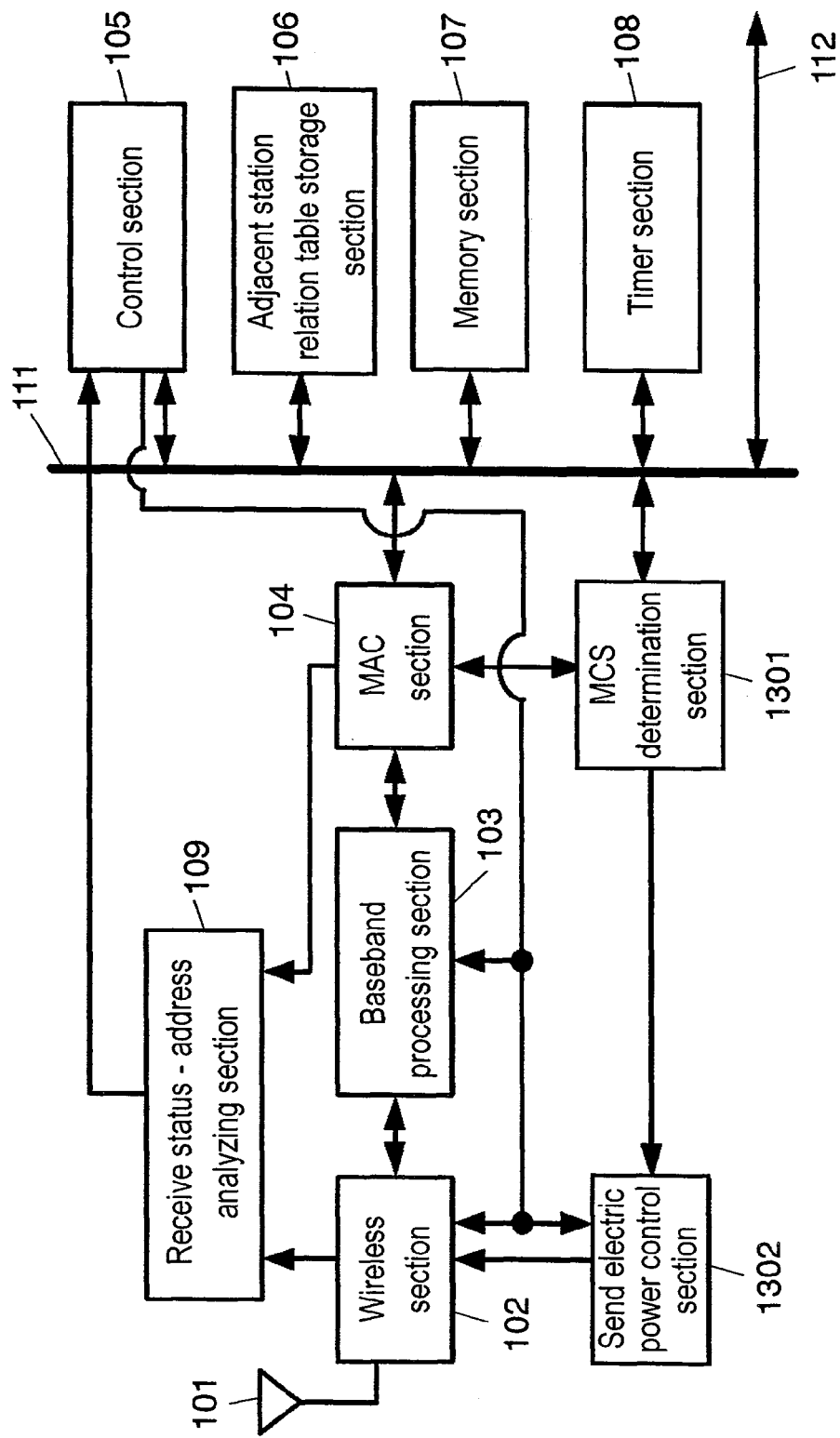
FIG. 13 is a block diagram showing a configuration of a wireless communication device in a WNS in accordance with a third exemplary embodiment of the present invention.
Figure 15:
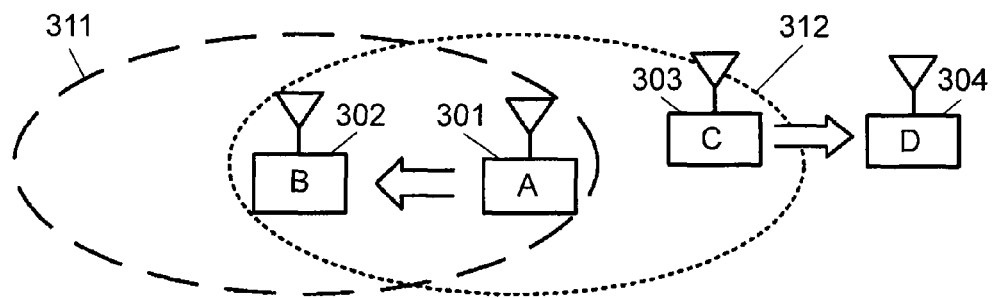
FIG. 15 is a plan layout view showing a wireless communication device in a conventional WNS.
Figure 16:
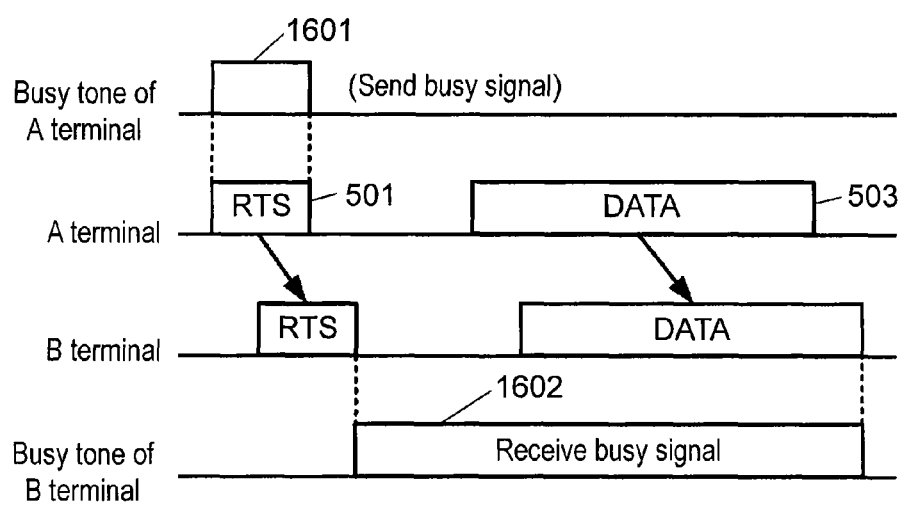
FIG. 16 is a timing chart showing an operation of each wireless communication device in a conventional WNS using a DBTMA method.

FIG. 13 is a block diagram showing a configuration of a wireless communication device in a WNS in accordance with a third exemplary embodiment of the present invention. This wireless communication device includes antenna 101, wireless section 102, baseband processing section 103, MAC section 104, control section 105, adjacent station relation table storage section 106, memory section 107, timer section 108, receive status-address analyzing section 109, MCS (Modulation and Coding Selection; selection of a modulation multivalue number and a coding rate) determination section 1301, send electric power control section 1302, internal bus 111, and external interface 112. MCS determination section 1301 determines a modulation multivalue number and a coding rate so that the highest throughput is realized based on the received signal quality.

The wireless communication device in accordance with the third exemplary embodiment gives consideration to the fact that when C terminal 303 and A terminal 301 carry out sending at the same time, interference is given to B terminal 302 receiving a signal from A terminal 301 although it is slight. In order to minimize the interference given to B terminal 302, electric power sent from C terminal 303 is suppressed and accordingly the speed of the MCS is set to be reduced, thus reducing a modulation multivalue number and a coding rate. Thus, an error due to the reduction of the send electric power is prevented.

MCS determination section 1301 firstly determines an optimum MCS when the sending is carried out at a maximum electric power. Then, B terminal 302 replies CTS signal 502. Electric power-address analyzing section 109 and the like detects received electric power whose noise level is so small that it cannot be not recognized as CTS signal 502 at the timing A terminal 301 receives; sets a send electric power corresponding to the detection level; and inputs the set electric power into send electric power control section 1302. In other words, it is shown that the larger the detected level is, the nearer the distance between B terminal 302 and C terminal 303 is. When sending is carried out with a maximum electric power, interference amount to be given is increased. Therefore, the send electric power is reduced.

Subsequently, based on the ratio (attenuation amount) between a set value of send electric power and maximum send electric power, optimum MCS is determined again. When the terminal has a table of MCS set values about the signal-to-noise ratio, the signal-to-noise ratio is read by reducing the attenuation amount.

Herein, when the maximum send electric power that can be sent is largely different for every terminal, for example, when the maximum send electric power of C terminal 303 is larger than that of B terminal, CTS signal 502 of B terminal 302 cannot be detected by C terminal 303. However, C terminal 303 carries out sending at a maximum electric power, interference may be provided to B terminal 302. Therefore, for example, a uniform index about sending output level is preferably set in advance. Went this sending output level index is included in an RTS signal and a CTS signal sent by each terminal and the sending of the received RTS signal at higher than the designated sending output level is prohibited, the occurrence of interference can be prevented. That is to say, when it is determined that a CTS signal is replied at the sending output level index set by a RTS signal, duality between sending and receiving can be secured to some extent. Thus, as in the present invention, even when C terminal 303 that is an exposed terminal carries out sending, no or slight amount of interference is given to B terminal 302.

Fourth Exemplary Embodiment

When an adjacent station relation table used in the present invention is formed, when a method for confirming by sending a signal (HELLO message and the like) for recognizing the presence of an adjacent station as in, for example, a procedure for forming a routing table of ad hoc network, is employed, a so-called flooding is necessary, thus remarkably deteriorating the transmission efficiency. In this method, a signal sent from another terminal is received, and signal quality of the received signal and an address of a sender terminal is related. Then, by sending the result of the relation to a terminal adjacent to the own terminal, which can be directly communicate, the adjacent station between terminals can be understood.

In many methods for forming a routing table, a route that is not excellent in signal quality is excluded and only a route with high reliability and a route having a small number of hops are stored. In the method of the present invention, terminals that are not excellent in a signal quality, to which interference may be given when the own terminal carries out sending, are necessary to be listed up. Therefore, a routing table pursuing only the transmission efficiency is not sufficient.

Furthermore, since a routing table is required to have a route to the destination terminal, it is not a suitable configuration for searching adjacent stations around the destination terminal. FIG. 14 is a table showing an example of a routing table of a wireless communication device in a WNS in accordance with the fourth exemplary embodiment of the present invention. The routing table shown in FIG. 14 has a configuration in which adjacent stations of the destination terminal with the own station as a center can be extracted easily. Furthermore, a relation table may be formed by using a distance to the destination terminal as a standard. As a method for converting a general routing table into the adjacent station relation table as shown in FIG. 4, terminals adjacent to all the terminals may be extracted. Herein, provided that the duality of the sending and receiving signal is sufficient, a table limited to the half of the table shown in FIG. 4 may be employed.

As mentioned above, the present invention is described with reference to drawings, in the present invention, all the terminals may be moved, or at least one terminal of four terminals may be fixed like an access point.

INDUSTRIAL APPLICABILITY

A WNS, a wireless communication method and a wireless terminal device of the present invention have an excellent effect that a terminal, which has conventionally been an "exposure terminal (exposed terminal)" and cannot send data, can send data in a frequency band that does not require a license even during a so-called NAV period, thus preventing the deterioration of the wireless transmission efficiency.

The invention claimed is:

1. A method for use in a first mobile terminal in a wireless network, the first mobile terminal comprising a MAC unit and a signal monitoring unit, the method comprising:
   receiving a request-to-send (RTS) from a second mobile terminal;
   determining whether a clear-to-send (CTS) corresponding to the RTS is received; and
   when the CTS is not received:
      obtaining a destination address of a frame in a transmission queue,
      confirming, by the MAC unit, whether a second mobile terminal corresponding to a destination address is out of signal reachable areas of both the first mobile terminal and a destination terminal, the destination terminal being indicated in the RTS,
   wherein, when the second mobile terminal is out of the signal reachable areas of both the first mobile terminal and the destination terminal:
      activating, by the MAC unit, the signal monitoring unit,
      monitoring, by the signal monitoring unit, a signal quality being transmitted from the first mobile terminal,
      determining, by the signal monitoring unit, whether the signal quality is deteriorated within a predetermined time period after it is determined that the CTS is not received, and
      starting a sending procedure for the frame when the signal monitoring unit determines that the signal quality is not deteriorated.

2. A wireless network system comprising:
   a first terminal for sending a request-to-send signal including information on a medium use period to a second terminal before sending data, receiving a clear-to-send signal from the second terminal, and sending the data to the second terminal during the medium use period;
   the second terminal for receiving the request-to-send signal and sending the clear-to-send signal;
   a third terminal for receiving the request-to-send signal and sending data to a fourth terminal during the medium use period; and
   the fourth terminal,
   wherein when a determination is made that the third terminal cannot receive the clear-to-send signal, the third terminal confirms an area in which the fourth terminal is present,
   when confirmation that the area in which the fourth terminal is present is out of signal reachable areas of the first terminal and the second terminal, the third terminal monitors whether a signal quality of the first terminal deteriorates from a first signal quality to a second signal quality lower than the first signal quality over a predetermined period after the determination that the clear-to-send signal is not received, to determine whether an adjacent terminal that is out of the signal reachable areas of the first terminal and the second terminal is transmitting in the predetermined period, and the third terminal carries out sending when a determination is made that the signal quality is not deteriorated in the predetermined period.

3. The wireless network system of claim 2, wherein the third terminal finishes sending the data during the medium use period.

4. The wireless network system of claim 2, wherein the third terminal sends the data while avoiding a period during which the second terminal sends an acknowledgement signal to the first terminal.

5. The wireless network system of claim 2, wherein the third terminal has an adjacent station relation table showing a relation between a receive status of a signal from an adjacent terminal and an address of the adjacent terminal in the fourth terminal, and confirms that the fourth terminal is out of the signal reachable areas of the first terminal and the second terminal by using the adjacent station relation table.

6. The wireless network system of claim 5, wherein the third terminal obtains the adjacent station relation table from the adjacent terminal before sending the data.

7. The wireless network system of claim 6, wherein the receive status of the signal from the adjacent terminal shows a received electric power of the signal from the adjacent terminal.

8. The wireless network system of claim 6, wherein the receive status of the signal from the adjacent terminal shows a signal quality of the signal from the adjacent terminal.

9. The wireless network system of claim 8, wherein the signal quality of the signal from the adjacent terminal is obtained by calculating a soft decision likelihood of the signal from the adjacent terminal, correcting an error, and smoothing the soft decision likelihood when an error is not detected.

10. The wireless network system of claim 9, wherein the signal quality of the signal from the adjacent terminal is an average value of values obtained from plural signals from the adjacent terminal.

11. The wireless network system of claim 8, wherein the signal quality of the signal from the adjacent terminal is an average value of values obtained from plural signals from the adjacent terminal.

12. The wireless network system of claim 5, wherein the receive status of the signal from the adjacent terminal shows a received electric power of the signal from the adjacent terminal.

13. The wireless network system of claim 5, wherein the receive status of the signal from the adjacent terminal shows a signal quality of the signal from the adjacent terminal.

14. The wireless network system of claim 13, wherein the signal quality of the signal from the adjacent terminal is obtained by calculating a soft decision likelihood of the signal from the adjacent terminal, correcting an error, and smoothing the soft decision likelihood when an error is not detected.

15. The wireless network system of claim 14, wherein the signal quality of the signal from the adjacent terminal is an average value of values obtained from the signals from plural adjacent terminal.

16. The wireless network system of claim 13, wherein the signal quality of the signal from the adjacent terminal is an average value of values obtained from plural signals from the adjacent terminal.

17. The wireless network system of claim 2, wherein
   the third terminal sends a request-to-send signal to the fourth terminal before sending the data to the fourth terminal; and the fourth terminal receives the request-to-send signal from the third terminal and sends a clear-to-send signal to the third terminal.

18. The wireless network system of claim 2, wherein the third terminal observes a signal quality of the data sent by the first terminal for an arbitrary period, and sends the data to the fourth terminal when a change amount of the signal quality of the data during the arbitrary period is not more than a predetermined value.

19. The wireless network system of claim 2, wherein the third terminal observes a signal quality of the clear-to-send signal sent by the second terminal, and changes a send electric power when the third terminal sends the data to the fourth terminal according to the signal quality of the clear-to-send signal.

20. The wireless network system of claim 19, wherein a modulation multivalue number or a coding rate is changed according to the send electric power.

21. The wireless network system of claim 2, wherein each terminal comprises:
   an antenna for receiving a radio signal;
   a wireless section for converting the radio signal into a baseband signal;
   a baseband processing section for converting the baseband signal from analog to digital, demodulating the converted signal, and outputting the demodulated signal as receive data;
   an MAC section for controlling the baseband processing section and recognizing a packet of the receive data;
   a control section for starting to receive the packet;
   a receive status-address analyzing section for inputting a relation between a receive status of an other signal detected by the antenna or the wireless section or the baseband processing section and an address of the corresponding terminal sending the other signal detected by the MAC section into the control section, when the radio signal is not received; and
   an adjacent station relation table storage section in which the relation is described by the control section.

22. A method of operating a mobile terminal in a wireless network, the mobile terminal comprising a MAC unit and a signal monitoring unit, the method comprising:
   receiving a request-to-send (RTS) from a further mobile terminal;
   determining whether a clear-to-send (CTS) corresponding to the RTS is received; and
   when a determination is made that the CTS is not received:
      obtaining a destination address of a frame in a transmission queue,
      confirming, by the MAC unit, whether a terminal corresponding to the destination address is out of signal reachable areas of both the further mobile terminal and a destination terminal, the destination terminal being indicated in the RTS,
   wherein, when the terminal is out of the signal reachable areas of both the further mobile terminal and the destination terminal:
      activating, by the MAC unit, the signal monitoring unit,
      monitoring, by the signal monitoring unit, a signal quality being transmitted from the further mobile terminal over a predetermined period after the determination that the CTS is not received,
      determining, by the signal monitoring unit, whether the signal quality is deteriorated from a first signal quality to a second signal quality lower than the first signal quality within the predetermined period, to determine whether an adjacent terminal that is out of the signal reachable areas of the further mobile terminal and the destination terminal is transmitting in the predetermined period, and
      starting a sending procedure for the frame when the signal monitoring unit determines that the signal quality is not deteriorated in the predetermined period.

\* \* \* \* \*